INVENTOR
D. H. LIEN
BY J. J. Landis
ATTORNEY

INVENTOR
D. H. LIEN
BY J. S. Landis
ATTORNEY 3,262,048
Patented July 19, 1966

3,262,048

FREQUENCY MULTIPLIER CIRCUIT INCLUDING A SEQUENTIAL PULSING CIRCUIT

Dallas H. Lien, Indianapolis, Ind., assignor to Western Electric Company, Incorporated, New York, N.Y., a corporation of New York Filed May 2, 1962, Ser. No. 191,848
11 Claims. (Cl. 321—68)

This invention relates to frequency multiplier circuits including sequential pulsing circuits, and more specifically relates to the utilization of such circuits for providing a composite output signal which has a frequency that is a multiple of the frequency of an input signal. Accordingly, objects of this invention are to provide new and improved circuits of such character.

Another object of the invention is to provide a frequency multiplier circuit that is responsive to a symmetrical alternating input signal for sequentially driving succeeding ones of a series of bistable magnetic memory devices from one stable state to the other and back again during alternate half cycles of the input signal to induce a composite output signal in an output conductor having a frequency equal to the frequency of the input signal times the number of memory devices.

A further object of this invention is to provide a circuit responsive to a square wave input signal for sequentially driving succeeding ones of a series of bistable memory devices from primary stable states to secondary stable states during one-half cycle of the input signal and for sequentially driving the memory devices in the same sequence from the secondary stable states back to the primary stable states during the next half cycle of the input signal so that an output signal is induced in an output conductor associated with the memory devices which has a frequency signal to the frequency of the input signal times the number of memory devices.

An additional object of this invention is to provide a circuit for sequentially inducing flux change pulses in succeeding ones of a plurality of magnetic components.

With these and other objects in mind, the present invention relates, in part, to a circuit for providing a composite output signal having a frequency that is a multiple of the frequency of a symmetrical alternating input signal having positive and negative half cycles of equal amplitude. A series of sequentially arranged, bistable magnetic memory devices is provided, and an output conductor is associated therewith. A pulsing control circuit is associated with the memory devices and is responsive to the input signal so that, during alternate half cycles of the input signal, the memory devices are sequentially driven from one stable state to the other and back again to induce a series of independent output signals in the output conductor.

A pulse control circuit in accordance with certain aspects of the invention includes first and second control means for applying magnetizing forces of opposite polarities to the memory devices in response to the application thereto of an alternating input signal as described in the preceding paragraph. Each control means is connected to the input signal source and includes a control winding wound on each magnetic component in a winding direction which is opposite to that of the other. The first control means is so arranged that a greater instantaneous magnetizing force is applied to each succeeding memory device in the series in response to the application of any given input signal to the first control means. The second control means is so arranged that equal instantaneous magnetizing forces are applied to all memory devices in the series in response to the application of any given input signal to the second control means. In addition, means are provided for progressively varying the current in all of the control windings of one control means relative to the other during each half cycle of the input signal so that a differential magnetizing force sufficient to drive the memory devices from one stable state to the other is applied to succeeding ones of the memory devices during each half cycle of the input signal.

Other objects, advantages, and aspects of the invention will become apparent by reference to the following detailed description of certain specific embodiments thereof, when read in conjunction with the accompanying drawings, in which.

Figures 1, 2:
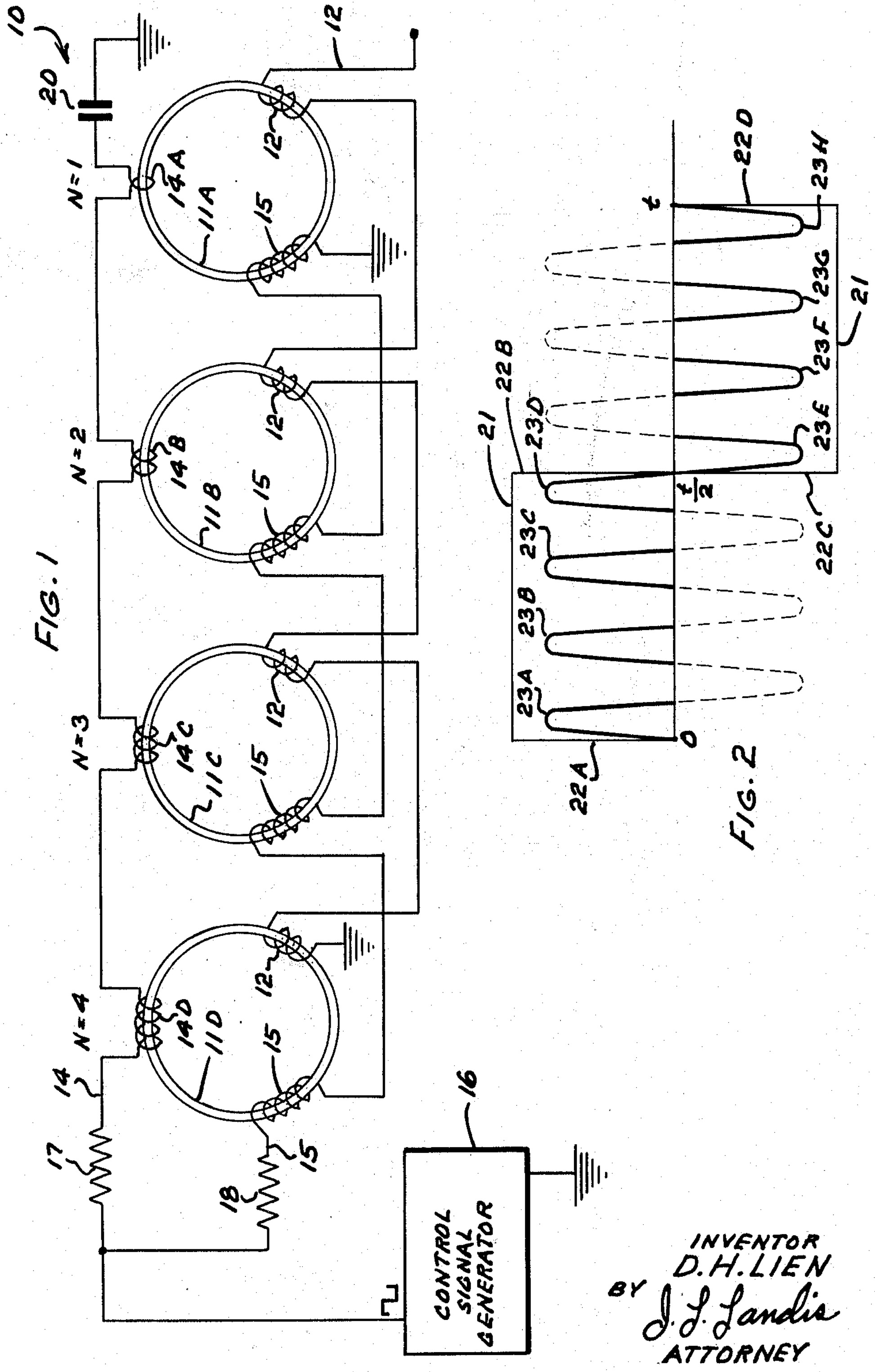
FIG. 1 is an enlarged view of a simplified frequency multiplier circuit in accordance with the principles of the invention, including a first pulsing control winding arrangement.
FIG. 2 illustrates the relationship between an input signal and an output signal for the frequency multiplier circuit illustrated in FIG. 1.

Referring now in detail to the drawings and more specifically to FIG. 1, a frequency multiplier circuit 10 is illustrated which includes a plurality of sequentially arranged, bistable magnetic memory devices 11A–11D. The memory devices 11A–11D are preferably ring type magnetic components composed of a material having a nearly rectangular hysteresis loop, such as magnesium-manganese ferrite and copper-manganese ferrite, so that each memory device has a primary stable state (negative magnetic saturation) and a secondary stable state (positive magnetic saturation). More specifically, the memory devices are bistable and are incapable of assuming any other states of magnetization.

A memory device may be driven from one stable state to the other stable state only when a magnetizing force is applied thereto which has an amplitude that is at least equal to the coercive force between the two stable states. A magnetizing force less than that required to drive the memory device from one stable state to the other stable state will urge the memory device toward the other stable state but will have no resultant effect thereon and the memory device will remain in the original stable state. The frequency multiplier 10 is designed to provide a composite output signal having a frequency which is equal to the frequency of an alternating input signal times the number of magnetic memory devices. The illustrated frequency multiplier, using a square wave input signal having positive and negative half cycles of equal polarity, is a frequency quadrupler (i.e., for each input pulse, four output pulses are provided).

An output conductor 12 is wound on the memory devices 11A–11D so that, each time a memory device is driven from one stable state to the other, an output signal is induced in the output conductor 12. In accordance with the principles of the invention, a composite output signal having a frequency equal to the frequency of an input signal times the number of memory devices is preferably provided by sequentially driving the memory devices 11A–11D from the primary stable states to the second stable states during one half cycle of the input signal and then sequentially driving the memory devices 11A–11D from the secondary stable states back to the primary stable states in the same sequence during the next half cycle of the input signal.

A pair of pulsing control windings 14 and 15 are wound on the memory devices 11A–11D so as to be electromagnetically associated therewith, and each control winding has a prescribed winding pattern characteristic which is distinct from but bears a predetermined relationship to the winding pattern characteristic of the other control winding so that a different combination of the control winding patterns is established on each memory device. A control signal generator 16 for the square wave input signal is connected to both of the control windings 14 and 15 through associated resistors 17 and 18. The input signals sequentially induce magnetizing forces adjacent succeeding ones of the memory devices 11A–11D during the first half of each cycle of the control signal so that the memory devices are sequentially driven from the primary stable states to the secondary stable states and sequentially induce magnetizing forces adjacent succeeding ones of the memory devices 11A–11D during the second half of each of the input signal which are opposite in polarity to the magnetizing forces induced during the first half of each cycle so that the memory devices are sequentially driven from the secondary stable states to the primary stable states.

According to a first specific control winding arrangement, the first control winding 14 is wound on the memory devices 11A–11D in a linearly increasing winding pattern so that a minimum number of turns thereof are wound on the memory device 11A and the number of turns wound on each succeeding memory device 11B–11D is increased in equal increments from the number of turns wound on the next preceding memory device. In the illustrated embodiment, the number of turns N wound on each memory device is determined by the equation $$N = N_{\min} M$$

wherein $N_{\min}$ is an arbitrary constant designated as the minimum number of turns to be wound on any memory device (chosen as 1 in the illustrated embodiment) and M is the number of the particular memory device (the memory devices 11A–11D being sequentially numbered from 1 to 4), so that four turns (14D) are wound on the memory device 11D, three turns (14C) are wound on the memory device 11C, two turns (14B) are wound on the memory device 11B, and one turn (14A) is wound on the memory device 11A.

When an input signal is applied to the first control winding 14, the magnetizing force induced adjacent each succeeding memory device 11A–11D is greater in amplitude than the magnetizing force induced adjacent the next preceding memory device but less in amplitude than the magnetizing force induced adjacent the next succeeding memory device since a different number of turns is wound on each memory device and the magnetizing force is dependent upon the number of turns. The winding directions of the first control winding 14 are in second hand or negative directions so that, when a positive input signal is applied thereto, negative magnetizing forces are applied to the memory devices 11A–11D and, when a negative signal is applied thereto, positive magnetizing forces are applied to the memory devices 11A–11D.

The second control winding 15 is wound on the memory devices 11A–11D so that the same number of turns is wound on each memory device and, when an input signal is applied thereto, magnetizing forces having equal amplitudes are applied to all the memory devices 11A–11D. The winding directions of the second control winding 15 are in first hand or positive directions so that, when a positive signal is applied thereto, positive magnetizing forces are applied to the memory devices 11A–11D and, when a negative signal is applied thereto, negative magnetizing forces are applied to the memory devices 11A–11D.

The control signal generator 16 supplies a square wave input signal 21, which has equal positive and negative amplitudes as illustrated in FIG. 2, to the control windings 14 and 15 through the resistors 17 and 18. The resistors 17 and 18 limit the amplitudes of the currents flowing through the control windings. During the first half of each cycle, the generated square wave input signal 21 is positive so that positive magnetizing forces are induced by application thereof to the second control winding 15 and negative magnetizing forces are induced by application thereof to the first control winding 14 and, during the second half of each cycle, the generated square wave input signal 21 is negative so that negative magnetizing forces are induced by application thereof to the second control winding 15 and positive magnetizing forces are induced by application thereof to the first control winding 14.

A capacitor 20 is connected in series with the first control winding 14, and the capacitor gradually charges towards the value of the square wave input signal 21 during each half cycle thereof. As a result, the resultant current applied to all four individual windings 14A–14D of the control winding 14 progressively decays so that the magnetizing forces applied thereby to the memory devices 11A–11D gradually decrease proportionately. In essence, the resultant input signal applied to the first control winding is defined by the following equation:

$$i = \frac{2E}{R} e^{-t/RC}$$

wherein E is the amplitude of the square wave input signal 21, R is the combined resistance of the control winding 14 and the series resistance 17, C is the capacitance value of the capacitor 20, and $t$ is the time for each half cycle of the square wave input signal 21 ($t$ starting at 0 for each voltage reversal).

As the magnetizing forces induced by applying the square wave input signal 21 to the first control winding 14 gradually decrease during each half cycle of the square wave input signal, the magnetizing forces induced by aplying the same square wave input signal to the second control winding sequentially overcome the magnetizing forces induced adjacent succeeding ones of the memory devices 11A–11D by applying the square wave input signal to the first control winding; that is, the differential magnetizing force of winding 15 minus winding 14 sequentially drives succeeding ones of the memory devices 11A–11D from one stable state to the other stable state during each half cycle of the square wave input signal to induce output signals in the output conductor 12.

In the illustrated embodiment, as the input signal applied to the first control winding gradually decreases, the memory device 11A is the first to be driven from one stable state to the other stable state since the magnetizing force induced adjacent a memory device is proportional to the number of turns wound thereon and the memory device 11A has the least number of turns of the first control winding wound thereon. Succeeding ones of the other memory devices 11B–11D are then sequentially driven from one stable state to the other stable state since the number of turns of the first control winding wound on each succeeding memory device 11B–11D are greater in number than the number of turns wound on the next preceding memory device.

Thus, during the first half of each cycle of the square wave input signal 21, the input signal is positive and succeeding ones of the memory devices 11A–11D are sequentially driven from the primary stable states to the secondary stable states so that a series of positive output signals are induced in the output conductor 12. During the second half of each cycle of the square wave input signal 21, the input signal is negative and succeeding ones of the memory devices 11A–11D are sequentially driven from the secondary stable states to the primary stable states so that a series of negative output signals are induced in the output conductor 12.

The parameters of the frequency multiplier circuit 10 are so preselected that, for each half cycle of the square wave input signal 21 illustrated in FIG. 2, the memory device 11A is driven from one stable state to the other stable state immediately following the leading edges 22A and 22B of the two half cycles of the square wave input signal 21, and the memory devices 11B–11D are sequentially driven from one stable state to the other stable state in timed relationship with respect to the operation of the memory device 11A so that the memory device 11D is driven from one stable state to the other stable state just prior to the trailing edges 22C and 22D of the two half cycles of the square wave input signal 21. Thus, for the illustrated embodiment, four positive output signals 23A–23D are sequentially induced in the output conductor 12 during the first half of each cycle of the square wave input signal and four negative output signals 23E–23H are induced in the output conductor 12 during the second half of each cycle of the square wave input signal. As illustrated, the parameters of the circuit are so selected that the output signals 23A–23H are spaced to provide maximum energies which are in the seventh harmonic of the square wave input signal. However, the circuit parameters may be so selected that the output signals 23A–23H are equally spaced apart and the maximum energies would be in the eighth harmonic of the square wave input signal.

The frequency multiplier circuit 10 illustrated in FIG. 1 is a frequency quadrupler, since four output pulses are provided for each square wave input signal pulse. It should be noted, however, that an output signal which has a frequency that is any desired multiple of an input signal frequency may be provided by adding or subtracting memory devices from the frequency multiplier circuit 10 of FIG. 1 and determining the number of turns of the first control winding 14 by a linear relationship since the resultant output frequency will be equal to the number of memory devices times the frequency of the input signal.

The frequency multiplier circuit 10 may theoretically be classified as a frequency septupler since, if the output signal is completed as shown by the phantom lines in FIG. 2, seven cycles of the output signal are provided for each cycle of the square wave input signal. Additionally, if the circuit parameters are selected to provide output signals in the eighth harmonic of the square wave input signal as previously set forth and the output is full wave rectified, the frequency multiplier circuit 10 may theoretically be classified as a frequency octupler since eight cycles of the output signal are provided for each cycle of the square wave input signal.

*Second control winding arrangement*

Figure 3:
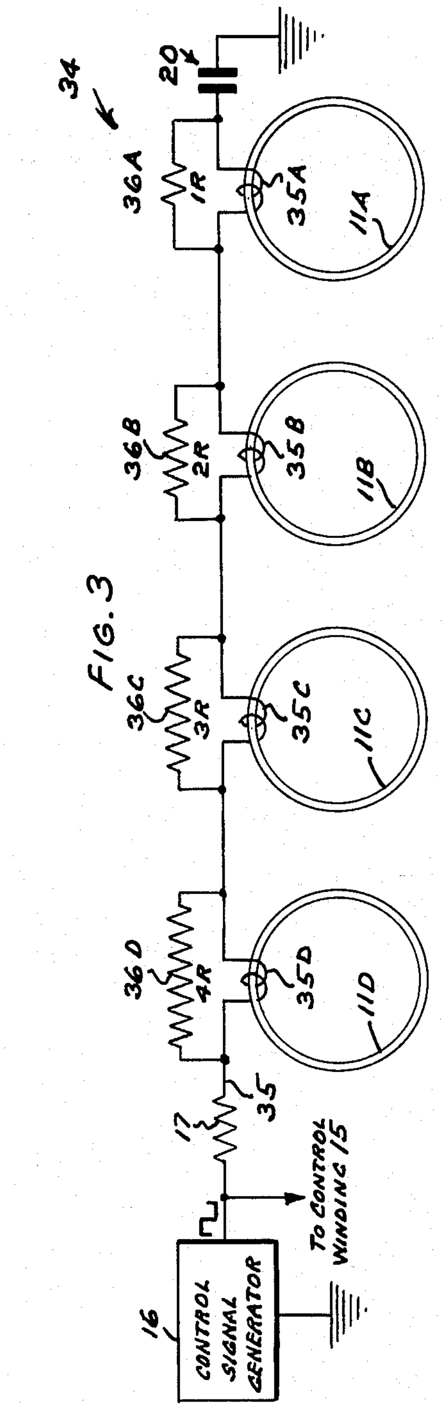
FIG. 3 illustrates a second pulsing control winding arrangement for the frequency multiplier circuit illustrated in FIG. 1.

The control winding arrangement 34 illustrated in FIG. 3 may be substituted for the first control winding 14 illustrated in FIG. 1 to provide the desired results in the operation of the frequency multipler circuit 10 illustrated in FIG. 1.

A control winding 35 is wound on the memory devices 11A–11D so as to be electromagnetically associated therewith, and one end thereof is connected to the control signal generator 16 through the resistor 17. The same number of turns (35A–35D) of the control winding 35 is wound on each memory device in this arrangement. The winding directions are in a second hand or negative direction so that, when a positive input signal is applied thereto, negative magnetizing forces are induced adjacent the memory devices 11A–11D and, when a negative input signal is applied thereto, positive magnetizing forces are induced adjacent the memory devices 11A–11D.

Resistors 36A–36D are independently connected in parallel with the turns of the control winding 35 wound on each of the memory devices 11A–11D as illustrated in FIG. 3. The values of the resistors associated with each succeeding memory device 11A–11D increase in equal increments so that, when an input signal is applied to the control winding 35, a portion of the input signal flows through the turns of the control winding 35 wound on each succeeding memory device 11A–11D which is greater in amplitude than the portion of the input signal flowing through the turns of the control winding 35 wound on the next preceding memory device since the amplitude of the portion of the input signal flowing through the associated turns is determined by the value of the parallelly connected resistor. Therefore, since the number of turns wound on each memory device is the same, a magnetizing force is induced adjacent each succeeding memory device 11A–11D which is greater in amplitude than the magnetizing force induced adjacent the next preceding memory device and is less in amplitude than the magnetizing force induced adjacent the next succeeding memory device.

In the illustrated embodiment, the values $R_p$ of the resistors 36A–36D connected in parallel with the turns of the control winding 35 wound on the memory devices 11A–11D are determined by the equation $$R_p = R_{min} M$$

wherein $R_{min}$ is an arbitrary constant designated as the minimum value of a resistor associated with a memory device (chosen as R in the illustrated embodiment) and M is the number of the particular memory device (as previously set forth, the memory devices 11A–11D are sequently numbered from 1 to 4), so that a resistor with a value equal to R is associated with the memory device 11A, a resistor with a value equal to 2R is associated with memory device 11B, a resistor with a value equal to 3R is associated with the memory device 11C, and a resistor with a value equal to 4R is associated with the memory device 11D.

The capacitor 20 is connected to the end of the control winding 35 not connected to the control signal generator 16 and functions as previously described in conjunction with the first control winding 14 to gradually decay the amplitude of the input signal 21 applied to the control winding 35 and cause the amplitudes of the magnetizing forces induced thereby adjacent the memory devices 11A–11D to gradually decrease proportionately.

With the second control winding arrangement 34, the frequency multiplier circuit 10 operates similar to its operation with the first control winding arrangement. However, with the first control winding arrangement, the same input signal was applied to the turns associated with each memory device and the number of turns was different while, with the second control winding arrangement, the input signals applied to the turns associated with the memory devices have different amplitudes and the number of turns are the same. Thus, with the second control winding arrangement, the magnetizing forces induced adjacent the memory devices 11A–11D by applying the input signal 21 to the second control winding 15 sequentially overcome the effects of the magnetizing forces induced adjacent succeeding ones of the memory devices 11A–11D by applying the input signal 21 to the control winding 35 and sequentially drive succeeding ones of the memory devices 11A–11D from the primary stable states to the secondary stable states when the input signal 21 is positive and from the secondary stable states to the primary stable states when the input signal 21 is negative, to induce a series of output signals 23A–23H in the output conductor 12 as illustrated in FIG. 2.

*Third control winding arrangement*

Figure 4:
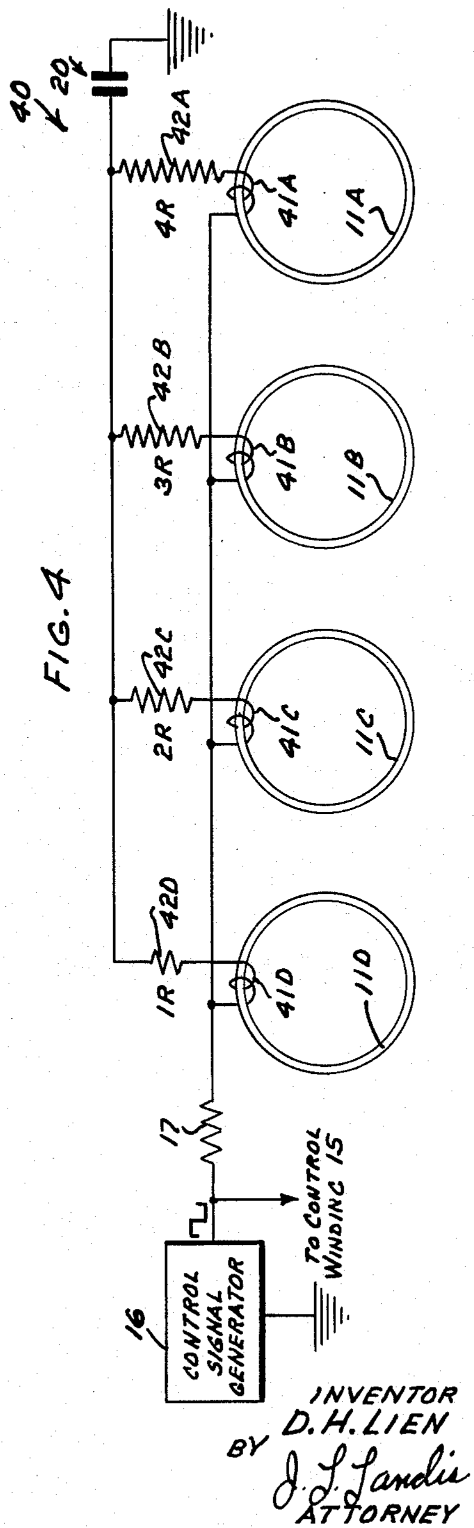
FIG. 4 illustrates a third pulsing control winding arrangement for the frequency multiplier circuit illustrated in FIG. 1.

The control winding arrangement 40 illustrated in FIG. 4 may also be substituted for the first control winding 14 illustrated in FIG. 1 to provide the desired results in the operation of the frequency multiplier circuit 10 illustrated in FIG. 1.

One of a plurality of control windings 41A–41D is wound on each of the memory devices 11A–11D, and resistors 42A–42D are independently connected in series with the control windings 41A–41D to form a plurality of resistor-control winding series arrangements as shown in FIG. 4. The resistor-control winding series arrangements are connected in parallel with respect to each other, and one end thereof is connected to the control signal generator 16 through the resistor 17. Each of the control windings 41A–41D has the same number of turns, and the winding directions thereof are in a second hand or negative direction so that, when a positive input signal is applied to the parallelly associated resistor-control winding series arrangements, negative magnetizing forces are induced adjacent the memory devices 11A–11D and, when a negative input signal is applied to the parallelly associated resistor-control winding series arrangements, positive magnetizing forces are induced adjacent the memory devices 11A–11D.

The values of the resistors associated with each succeeding memory device 11A–11D decrease in equal increments so that, when an input signal is applied to the parallelly associated resistor-control winding series arrangements, portions of the input signal having different amplitudes flow through the turns of the control windings 41A–41D associated with the memory devices 11A–11D. The portions of the input signal flowing through the control windings 41A–41D are related in a similar manner as the portions of the input signals set forth above in conjunction with the second control winding arrangement. Therefore, a magnetizing force is induced adjacent each succeeding memory device 11A–11D which is greater in amplitude than the magnetizing force induced adjacent the next preceding memory device and is less in amplitude than the magnetizing force induced adjacent the next succeeding memory device.

In the illustrated embodiment, the values $R_s$ of the resistors 42A–42D connected in series with the control windings 41A–41D wound on the memory devices 11A–11D are determined by the equation $$R_s = R_{max}(N - M + 1)$$

where $R_{max}$ is an arbitrary constant designated as the maximum value of a resistor associated with a memory device (chosen as R in the illustrated embodiment), N is the number of memory devices (4 in the illustrated embodiment), and M is the number of the particular memory device (as previously set forth, the memory devices 11A–11D are sequentially numbered from 1 to 4), so that a resistor with a value equal to 4R is connected in series with the control winding 41A, a resistor with a value equal to 3R is connected in series with the control winding 41B, a resistor with a value equal to 2R is connected in series with the control winding 41C, and a resistor with a value equal to R is connected in series with the control winding 41D.

The capacitor 20 is connected to the ends of the parallelly associated resistor-control winding series arrangements not connected to the control signal generator 16 and functions as previously described in conjunction with the first control winding 14 to gradually decrease the amplitude of the input signal 21 applied to the resistor-control winding series arrangements and cause the amplitudes of the magnetizing forces induced adjacent the memory devices 11A–11D to gradually decrease proportionately.

Thus, similarly to the operation of the frequency multiplier circuit 10 with the first control winding 14, the magnetizing forces induced adjacent the memory devices 11A–11D by applying the input signal 21 to the second control winding 15 sequentially overcome the effects of the magnetizing forces induced adjacent succeeding ones of the memory devices 11A–11D by applying the input signal 21 to the resistor-control winding series arrangements and sequentially drive succeeding ones of the memory devices 11A–11D from the primary stable states to the secondary stable states when the input signal 21 is positive and from the secondary stable states to the primary stable states when the input signal 21 is negative, to induce a series of output signals 23A–23H in the output conductor 12 as illustrated in FIG. 2.

While certain specific embodiments of the invention have been described in detail, it will be obvious that various modifications may be made from the specific details described without departing from the spirit and scope of the invention.

What is claimed is:

1. A frequency multiplier circuit for providing a composite output signal having a frequency that is a multiple of the frequency of a symmetrical alternating input signal having positive and negative half cycles of equal amplitude, which comprises:

a series of sequentially arranged, bistable magnetic memory devices;

first and second control means for applying magnetizing forces having opposite polarities to the memory devices in response to the application of the input signal thereto, each control means being connected to the source and including a control winding wound on each memory device in a winding direction which is opposite to that of the other, the first control means being so arranged that a greater instantaneous magnetizing force is applied to each succeeding memory device in the series in response to the application of any given input signal to the first control means, the second control means being so arranged that equal instantaneous magnetizing forces are applied to all memory devices in the series in response to the application of any given input signal to the second control means;

means for progressively varying the current in all of the control windings of one control means relative to the other during each half cycle of the input signal so that a differential magnetizing force sufficient to drive the memory devices from one stable state to the other is applied to succeeding ones of the memory devices during each half cycle of the input signal, the memory devices being sequentially driven from one stable state to the other and back again during alternate half cycles of the input signal; and an output conductor so wound on the memory devices that an output signal is induced therein each time a memory device is driven from one stable state to the other so that a composite output signal is induced in the output conductor having a frequency equal to the frequency of the input signal times the number of memory devices.

2. A frequency multiplier circuit for providing a composite output signal having a frequency that is a multiple of the frequency of a square wave input signal having positive and negative half cycles of equal amplitude, which comprises:

a series of sequentially arranged, bistable magnetic memory devices;

first and second control means for applying magnetizing forces having opposite polarities to the memory devices in response to the application of the input signal thereto, each control means being connected to the source and including a control winding wound on each memory device in a winding direction which is opposite to that of the other, the first control means being so arranged that a greater magnetizing force is applied to each succeeding memory device in the series in response to the application of any given input signal to the first control means, the second control means being so arranged that equal magnetizing forces are applied to all memory devices in the series in response to the application of any given input signal to the second control means;

means for progressively decaying the current in all of the control windings of one control means during each half cycle of the input signal so that a differential magnetizing force sufficient to drive the memory devices form one stable state to the other is applied to succeeding ones of the memory devices during each half cycle of the input signal, the memory devices being sequentially driven from one stable state to the other and back again during alternate half cycles of the input signal; and an output conductor so wound on the memory devices that an output signal is induced therein each time a memory device is driven from one stable state to the other so that a composite output signal is induced in the output conductor having a frequency equal to the frequency of the input signal times the number of memory devices.

3. A frequency multiplier circuit for providing a composite output signal having a frequency that is a multiple of the frequency of a square wave input signal having positive and negative half cycles of equal amplitude, which comprises:

a series of sequentially arranged, bistable magnetic memory devices;

first and second control means for applying magnetizing forces having opposite polarities to the memory devices in response to the application of the input signal thereto, each control means being connected to the source and including a control winding wound on each memory device in the same winding direction and one which is opposite to that of the control windings of the other control means, the first control means being so arranged that a greater magnetizing force is applied to each succeeding memory device in the series in response to the application of any given input signal to the first control means, the second control means being so arranged that equal magnetizing forces are applied to all memory devices in the series in response to the application of any given input signal to the second control means;

a capacitor connected in series with the first control windings for progressively decaying the current in all of those control windings during each half cycle of the input signal so that a differential magnetizing force sufficient to drive the memory devices from one stable state to the other is applied to succeeding ones of the memory devices during each half cycle of the input signal, the memory devices being sequentially driven from primary stable states to secondary stable states during one half cycle of the input signal and being driven in the same sequence back to the primary stable states during the next half cycle of the input signal; and an output conductor so wound on the memory devices that an output signal is induced therein each time a memory device is driven from one stable state to the other to induce in the output conductor a series of output signals equal in number to the number of memory devices during each half cycle of the input signal, the output signals being all one polarity during one half cycle and being all of the opposite polarity during the next half cycle.

4. The frequency multiplier circuit as recited in claim 3, wherein:

the number of turns N of the first control winding associated with each succeeding memory device is increased in equal increments and is determined by the equation $$N=N_{\min}M$$

$N_{\min}$ being an arbitrary constant designating the minimum number of turns to be wound on a memory device and M being the number of the particular memory devices (the memory devices being sequentially numbered).

5. The frequency multiplier circuit as recited in claim 3, wherein:

the number of turns of the first control winding associated with each memory device is the same; and a resistor is associated with each of the first control windings, the resistors having different values selected so that the amplitude of the input signal applied to the first control winding on each succeeding memory device is greater than the amplitude of the input signal applied to the first control winding on the preceding memory device whereby the magnetizing force applied to each succeeding memory device is greater than the magnetizing force applied to the preceding memory device.

6. A circuit for sequentially inducing flux change pulses in succeeding ones of a series of bistable magnetic components, which comprises:

a source of a symmetrical alternating input signal having positive and negative half cycles of equal amplitude;

first and second control means for applying magnetizing forces having opposite polarities to the magnetic components in response to the application of the input signal thereto, each control means being connected to the source and including a control winding wound on each magnetic component in a winding direction which is opposite to that of the other, the first control means being so arranged that a greater instantaneous magnetizing force is applied to each succeeding magnetic component in the series in response to the application of any given input signal to the first control means, the second control means being so arranged that equal instantaneous magnetizing forces are applied to all magnetic components in the series in response to the application of any given input signal to the second control means; and means for progressively varying the current in all of the control windings of one control means relative to the other during each half cycle of the input signal so that a differential magnetizing force sufficient to drive the magnetic components from one stable state to the other is applied to succeeding ones of the magnetic components during each half cycle of the input signal, the magnetic components being sequentially driven from one stable state to the other and back again during alternate half cycles of the input signal.

7. A circuit for sequentially inducing flux change pulses in succeeding ones of a series of bistable magnetic components, which comprises:

a source of a square wave input signal having positive and negative half cycles of equal amplitude;

first and second control means for applying magnetizing forces having opposite polarities to the magnetic components in response to the application of the input signal thereto, each control means being connected to the source and including a control winding wound on each magnetic component in a winding direction which is opposite to that of the other, the first control means being so arranged that a greater magnetizing force is applied to each succeeding magnetic component in the series in response to the application of any given input signal to the first control means, the second control means being so arranged that equal magnetizing forces are applied to all magnetic components in the series in response to the application of any given input signal to the second control means; and means for progressively decaying the current in all of the control windings of one control means during each half cycle of the input signal so that a differential magnetizing force sufficient to drive the magnetic components from one stable state to the other is applied to succeeding ones of the magnetic components during each half cycle of the input signal, the magnetic components being sequentially driven from one stable state to the other and back again during alternate half cycles of the input signal.

8. A circuit for sequentially inducing flux change pulses in succeeding ones of a series of bistable magnetic components, which comprises:

a source of a square wave input signal having positive and negative half cycles of equal amplitude;

first and second control means for applying magnetizing forces having opposite polarities to the magnetic components in response to the application of the input signal thereto, each control means being connected to the source and including a control winding wound on each magnetic component in the same winding direction and one which is opposite to that of the control windings of the other control means, the first control means being so arranged that a greater magnetizing force is applied to each succeeding magnetic component in the series in response to the application of any given input signal to the first control means, the second control means being so arranged that equal magnetizing forces are applied to all magnetic components in the series in response to the application of any given input signal to the second control means; and a capacitor connected in series with the first control windings for progressively decaying the current in all of those control windings during each half cycle of the input signal so that a differential magnetizing force sufficient to drive the magnetic components from one stable state to the other is applied to succeeding ones of the magnetic components during each half cycle of the input signal, the magnetic components being sequentially driven from primary stable states to secondary stable states during one half cycle of the input signal and being driven in the same sequence back to the primary stable states during the next half cycle of the input signal.

9. The circuit as recited in claim 8, wherein the number of turns N of the first control winding associated with each succeeding magnetic component is increased in equal increments and is determined by the equation $$N=N_{min}M$$

$N_{min}$ being an arbitrary constant designating the minimum number of turns to be wound on a magnetic component and M being the number of the particular magnetic component (the magnetic components being sequentially numbered).

10. The frequency multiplier circuit as recited in claim 8, wherein:

the number of turns of the first control winding associated with each magnetic component is the same; and a resistor is connected in parallel with each of the first control windings, the values $R_p$ of the resistors being determined by the equation $$R_p=R_{min}M$$

$R_{min}$ being an arbitrary constant designating the minimum value of the resistor to be connected in parallel with a first control winding and M being the number of the particular magnetic component (the magnetic components being sequentially numbered), so that the amplitude of the input signal applied to the first control winding on each succeeding magnetic component is greater than the amplitude of the input signal applied to the first control winding on the preceding magnetic component, whereby the magnetizing force applied to each succeeding magnetic component is greater than the magnetizing force applied to the preceding magnetic component.

11. The frequency multiplier circuit as recited in claim 8, wherein:

the number of turns of the first control winding associated with each magnetic component is the same; and a resistor is connected in series with each of the first control windings and the series connected resistors and first control windings are connected in parallel with each other, the values $R_s$ of the resistors being determined by the equation $$R_s=R_{max}(N-M+1)$$

$R_{max}$ being an arbitrary constant designating the maximum value of the resistor to be connected in series with a first control winding, N being the total number of magnetic components, and M is the number of the particular magnetic component (the magnetic components being sequentially numbered), so that the amplitude of the input signal applied to the first control winding on each succeeding magnetic component is greater than the amplitude of the input signal applied to the first control winding on the preceding magnetic component, whereby the magnetizing force applied to each succeeding magnetic component is greater than the magnetizing force applied to the preceding magnetic component.

References Cited by the Examiner

UNITED STATES PATENTS

| | | | |
|---|---|---|---|
| 2,580,446 | 1/1952 | Lovell et al. | 321—68 |
| 2,887,644 | 5/1959 | Ogle | 321—69 |

JOHN F. COUCH, *Primary Examiner.*

LLOYD McCOLLUM, *Examiner.*

G. J. BUDOCK, G. GOLDBERG, *Assistant Examiners.*